United States Patent

[11] 3,551,655

| | | |
|---|---|---|
| [72] | Inventor | Dale M. Walsh<br>Clearwater, Fla. |
| [21] | Appl. No. | 785,976 |
| [22] | Filed | Dec. 23, 1968 |
| [45] | Patented | Dec. 29, 1970 |
| [73] | Assignee | Honeywell Inc.<br>Minneapolis, Minn.<br>a corporation of Delaware |

[54] CONTROL APPARATUS FOR APPROXIMATING A SIGNAL WAVEFORM
7 Claims, 4 Drawing Figs.

[52] U.S. Cl. .................................................... 235/150.53,
235/197
[51] Int. Cl. .................................................... G06g 7/26
[50] Field of Search ............................................ 235/150.53,
150.5, 150.51, 150.52, 150.3, 150.31, 150.4;
328/14(Inquired); 340/347(OA); 235/197

[56] References Cited
UNITED STATES PATENTS

| | | | |
|---|---|---|---|
| 2,886,243 | 5/1959 | Sprague et al. ............... | 235/150.53 |
| 2,975,369 | 3/1961 | Vance .......................... | 328/14X |
| 3,314,015 | 4/1967 | Simone......................... | 328/14X |
| 3,373,273 | 3/1968 | Schubert ...................... | 235/150.53X |
| 3,435,196 | 3/1969 | Schmid......................... | 235/150.53X |
| 3,435,350 | 3/1969 | Powers......................... | 328/14 |

*Primary Examiner*—Malcolm A. Morrison
*Assistant Examiner*—Joseph F. Ruggiero
*Attorneys*—Fred Jacob and Leo Stanger

ABSTRACT: A discrete step curvefitter receives samples of a signal waveform and constructs an approximation of the signal from the samples. The system shown is designed to approximate or reconstruct a signal from samples taken at maximum and minimum points of the sampled signal. The signal is reconstructed by dividing the interval between each sample and the succeeding sample into $n$ discrete steps thereby providing a staircase waveform which can be smoothed or filtered.

INVENTOR.
DALE M. WALSH
BY Robert E. Walrath
ATTORNEY 3,551,655

CONTROL APPARATUS FOR APPROXIMATING A SIGNAL WAVEFORM

BACKGROUND OF THE INVENTION

Systems wherein a signal is sampled, the samples are converted to digital numbers, the digital numbers are processed or transmitted, the digital numbers are reconverted to analogue voltages, and the analogue voltages are used to reconstruct a signal are well known in the prior art. Generally the signal is reconstructed from the analogue voltages with the use of filters and/or integrators and similar circuitry. My copending application Ser. No. 656,844, filed Jul. 28, 1967 and the copending Pat. application of John L. Matthews and Paul W. Rice, Ser. No. 657,966, filed Aug. 2, 1967, now Pat. No. 3,524,075 both of which are assigned to the same assignee as the present invention, disclose circuitry for encoding a signal at the maximum and minimum points on the signal waveform. Most of the prior art schemes for reconstructing a signal from samples are not useable with samples representing the magnitude of the sampled signal at maximum and minimum points. This invention provides circuitry for reconstructing a signal from such samples.

SUMMARY OF THE INVENTION

This invention reconstructs a signal from samples taken at maximum and minimum points of the sampled signal. The samples are received and are transmitted to holding registers. The holding registers retain two successive samples. The two samples are converted to analogue voltages and the voltage difference between the two samples is divided into $n$ discrete voltages. A timing or control circuit controls the transfer of samples to the holding registers. The timing circuit also controls a gating network which gates the various $n$ discrete voltages to an output. The voltages are successively gated to provide discrete voltage steps at the output of the gating network. The discrete steps form a staircase type waveform which can be filtered or smoothed. This invention is particularly suited to decoding samples taken at maximum and minimum points of a signal.

Accordingly, it is an object of this invention to provide new and novel decoder apparatus.

It is another object of this invention to provide decoder apparatus suitable for approximating a signal waveform from samples taken at maximum and minimum points of the signal.

These objects and other objects and advantages of this invention will become evident to those skilled in the art upon a reading of this specification and the appended claims in conjunction with the drawings, of which:

DETAILED DESCRIPTION OF THE INVENTION

Figure 1:
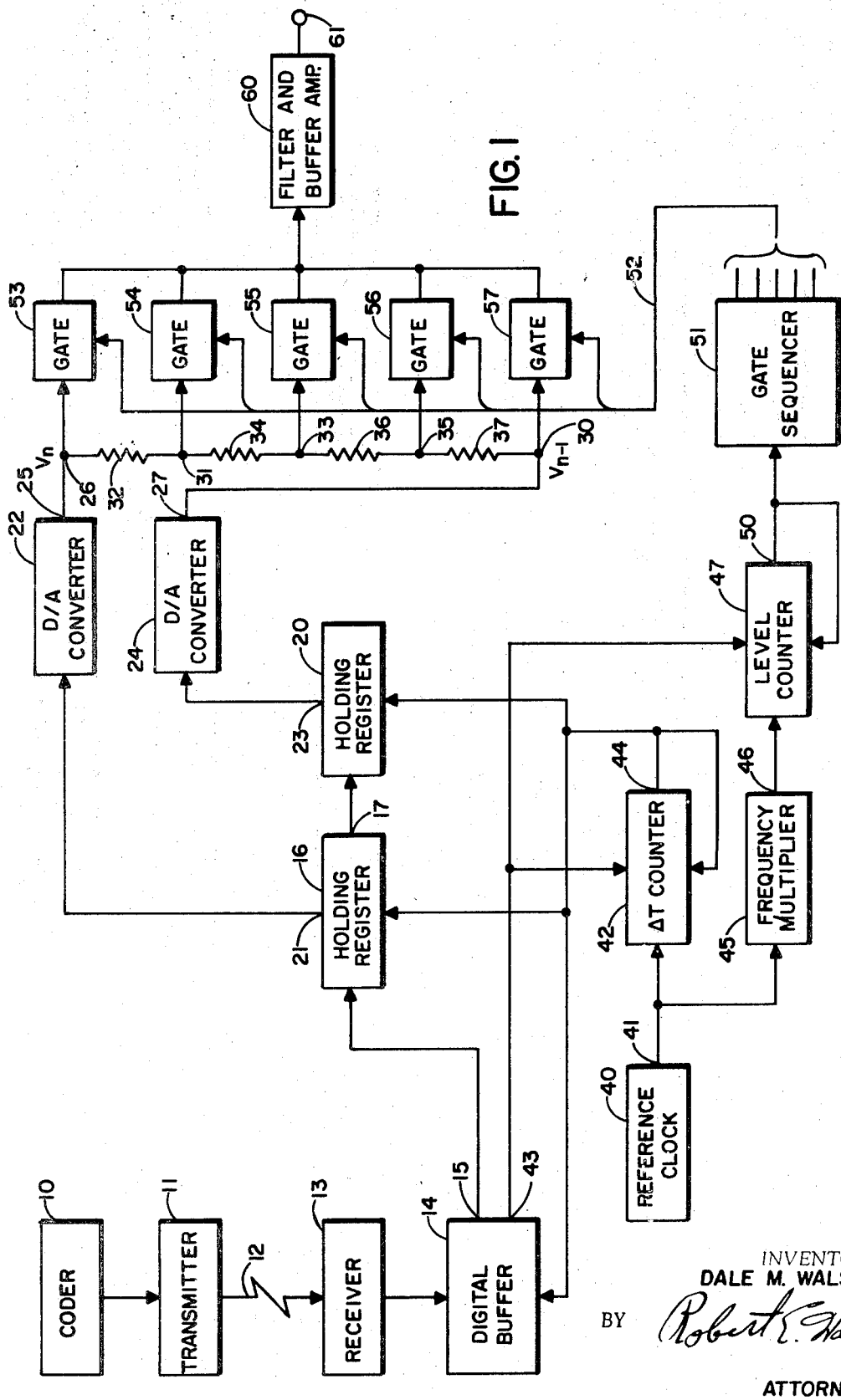
FIG. 1 is a block diagram of one embodiment of this invention.

FIG. 1 illustrates one embodiment of this invention which is particularly suitable for decoding or reconstructing a signal between data samples representative of samples taken at maximum and minimum points of a sampled waveform. A coder 10 is shown which may include either of the copending applications cited above. These applications disclose circuitry for sampling and coding a signal at its maximum and minimum points. Coder 10 has an output connected to a transmitter 11 which has an output connected by a data link 12 to a receiver 13. The output of receiver 13 is connected to an input means or digital buffer 14. Digital buffer 14 has an output 15 connected to a first register means or holding register 16 which has an output 17 connected to a second register means or holding register 20. An output 21 of holding register 16 is connected to an input of a converter or converting means or digital-to-analogue (D/A) converter 22. Holding register 20 has an output 23 connected to a converting or converter means or digital-to-analogue (D/A) converter 24.

An output 25 of D/A converter 22 is connected to a junction point 26. An output 27 of D/A converter 24 is connected to a junction point 30. Junction point 26 is connected to a junction point 31 by a resistance means or resistor 32. Junction point 31 is connected to a junction point 33 by a resistance means or resistor 34. Junction point 33 is connected to a junction point 35 by a resistance means or resistor 36. Junction point 35 is connected to junction point 30 by a resistance means or resistor 37. Resistors 32, 34, 36, and 37 comprise a voltage dividing means or voltage divider for dividing the difference between the output voltages of D/A converters 22 and 24 into discrete voltages. In the generalized case, the voltage divider includes at least $n-1$ resistors or their equivalent to provide $n$ discrete voltages.

A time reference clock 40 has an output 41 connected to an input of a timing means, counting means, or $\Delta T$ counter 42. An output 43 of digital buffer 14 is connected to a set input of counter 42. An output 44 of counter 42 is connected to a reset input of counter 42 and is further connected to inputs of holding registers 16 and 20 and to an input of digital buffer 14. Output 41 of reference clock 40 is further connected to a frequency multiplier 45 which has an output 46 connected to an input of a timing means, counting means, or level counter 47. Output 43 of digital buffer 14 is also connected to a set input of level counter 47. Level counter 47 has an output 50 connected to a reset input of level counter 47 and to an input of a gate driver, sequencing circuit, or gate sequencer 51. Gate sequencer 51 has $n$ outputs connected to a conductor means or cable 52. Counters 42 and 47, frequency multiplier 45, and gate sequencer 51 and their associated circuitry comprise a timing means or control means.

Individual conductors of conductors 52 are connected to various inputs of a gating means. The gating means includes $n$ gates. By way of example, five gates are shown. They are gates 53, 54, 55, 56, and 57. One of conductors 52 is connected to each of gates 53—57. Junction 54, 26 is connected to gate 53, junction point 31 is connected to gate 55, junction point 33 is connected to gate 55, and junction point 35 is connected to gate 56, and junction point 30 is connected to gate 57. The outputs of gates 53—57 are connected together and are connected to an input of an output means or filter and buffer amplifier 60 which has an output connected to an output terminal 61.

Figure 2:
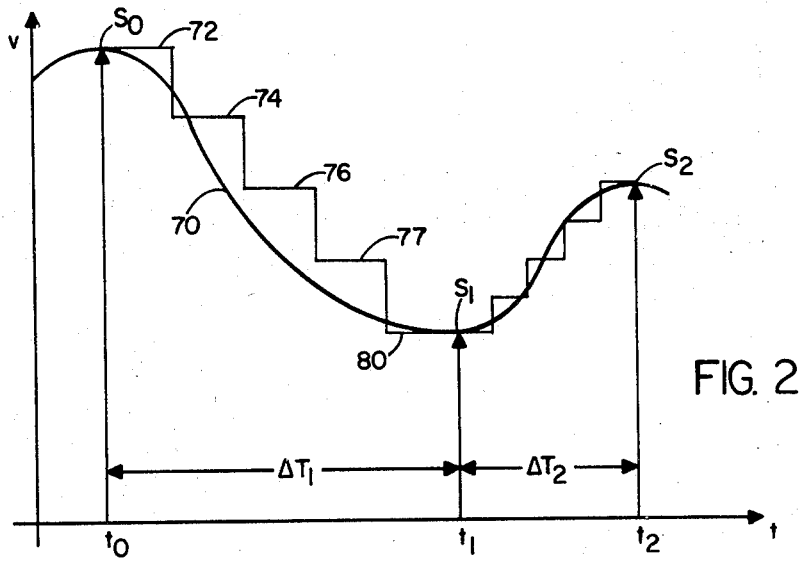
FIG. 2 is a graph showing waveforms to aid in the explanation of FIG. 1.

In the operation of FIG. 1 data signals are received and retained or stored in digital buffer 14. These data signals are transferred from digital buffer 14 to holding registers 16 and 20 as needed. Assume that a data signal $S_{-1}$ is stored or contained in holding register 20 and that a data signal $S_0$ is stored or contained in holding register 16. After the decoder has generated an approximation of the signal between those two samples, a data signal $S_1$ is transferred from digital buffer 14 to holding register 16 and data signal $S_0$ is transferred from register 16 to register 20. In FIG. 2 a curve 70 represents the original signal which was sampled and encoded in coder 10. Three amplitudes, $S_0$, $S_1$, and $S_2$, are shown. These amplitudes occur at maximum points ($S_0$ and $S_2$) and at minimum points ($S_1$) of signal 70. The data signals provided by digital buffer 14 at output 15 are representative of these samples. Sample $S_0$ occurred at time $td\ 0$ and was encoded at data signal $S_0$. Sample $S_1$ occurred at time $td\ 1$ and was encoded as data signal $S_1$. Sample $S_2$ occurred at time $t_2$ and was encoded as data signal $S_2$. Assume that each of these samples has been transmitted and received. Since the time between the samples is not uniform, another signal representative of the time difference between successive samples must also be provided. For example, the time between $td\ 0$ and $td\ 1$ is $\Delta T_1$ and the time between $td\ 1$ and $t_2$ is $\Delta T_2$ which is not equal to $\Delta T_1$. In order to approximate a signal from data signals $S_0$ and $S_1$, $\Delta T_1$ must also be known. $\Delta T_1$ can be determined in at least two ways. Coder 10 can provide a digital signal indicative of $\Delta T$ which can be transmitted along with the sample amplitudes. Alternatively, if the data signals are transmitted in real time, $\Delta T$ can be determined simply by measuring the time difference between receipt of successive data signals. In either case digital buffer 14 provides a digital signal at output 43 indicative of $\Delta T$.

Assume now that digital buffer 14 is providing a digital signal indicative of $\Delta T_1$ at output 43, that data signal $S_0$ is stored in register 20, and that data signal $S_1$ is stored in register 16. Register 16 provides data signals $S_1$ to D/A converter 22 which converts data signal $S_1$ to an analogue voltage $V_n$. Similarly, register 20 provides data signal $S_0$ to D/A converter 24 which decodes data signal $S_0$ and provides an analogue voltage $V_n-$. Ordinarily, registers 16 and 20 will provide parallel digital signals to the D/A converters. Since data signal $S_1$ is less than data signal $S_0$, voltage $V_n$ will be less than voltage $V_{n-1}$ and a current will flow from junction point 30 to junction point 26. A portion of this voltage will be dropped across each of resistors 37, 36, 34, and 32. Thus, several discrete voltages will be provided. Note that a potentiometer with a plurality of taps could be used as a voltage divider instead of individual resistors.

The digital signal representative of $\Delta T_1$ provided at output 43 of digital buffer 14 is coupled to a set input of counter 42 and to a set input of counter 47. Counter 47 can operate in one of at least two ways. The signal provided by digital buffer 14 can be used to set counter 42 and counter 42 will then count pulses from reference clock 40 downward or in a negative manner until it reaches zero at which time counter 42 will provide an output pulse at output 44. Alternatively, counter 42 can contain a comparator. Counter 42 then counts pulses from reference clock 40 until it reaches a count equal to the digital signal provided by digital buffer 14 at which time counter 42 will provide an output pulse at output 44.

Counter 47 operates essentially the same as counter 42 except that frequency multiplier 45 multiplies the signal from reference clock 40 by a number $n$ so that it counts $n$ times as fast. At this point it should be noted that the resistors of the resistor divider network provide five discrete voltages and five gates are used. With this arrangement frequency multiplier 45 would have a multiplication factor of five so that the pulses at output 46 of frequency multiplier 45 would be five times the frequency of the output pulses from reference clock 40. With this arrangement a five-level approximation of the sampled signal is made. Obviously, a five-level approximation is merely an example and more or fewer levels (generally $n$ levels) can be used as desired. Also, it should be noted that frequency multiplier 45 is not necessary since it can be replaced by a reference clock which provides a pulse train of five times the frequency of the pulse train provided by reference clock 40, but a frequency multiplier is preferred to synchronize the signals. All of these variations and modifications will be evident to those skilled in the art.

Figure 3:
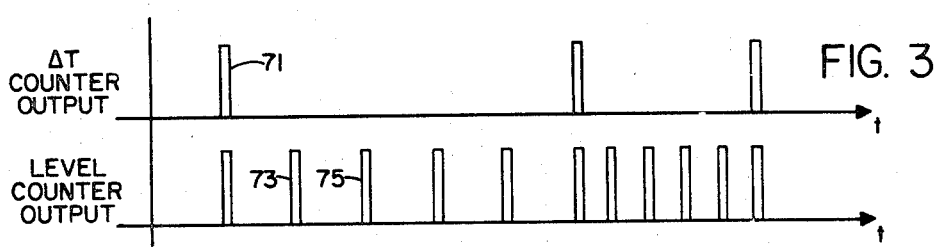
FIG. 3 is a timing diagram to aid in the explanation of FIG. 1.

At the start of the approximation of the signal between samples $S_0$ and $S_1$, counter 42 provides an output pulse which is indicated as pulse 71 in FIG. 3. This pulse resets counter 42 and causes digital buffer 14 to provide the digital signal representative of $\Delta T_1$ at output 43 and data signal $S_1$ at output 15. The output pulse from counter 42 also causes register 16 to store data signal $S_1$ and causes holding register 16 to transfer data signal $S_0$ to holding register 20. Counter 47 starts counting. At this time gate sequencer 51 is providing an output signal which enables gate 57. Gate 57 couples voltage $V_{n-1}$ to filter and buffer amplifier 60. In FIG. 2 the output voltage from gate 57 is indicated as step 72. When counter 47 provides an output pulse at output 50 (indicated as pulse 73 in FIG. 3), the output pulse resets counter 47 and steps gate sequencer 51. Gate sequencer 51 may be a ring counter or a shift register with a circulating "1." Gate 56 is enabled and couples the voltage at junction point 35 to the input of filter and buffer amplifier 60. The voltage provided by gate 56 is represented by step 74 in FIG. 2. Counter 47 again cycles and provides an output pulse (represented by pulse 75 in FIG. 3) which resets counter 47 and steps gate sequencer 51 another step. Gate 55 now provides an output voltage to filter and buffer amplifier 60 representative of the voltage at junction point 33. The output voltage from gate 55 is represented by step 76 in FIG. 2. Counter 47 continues cycling and providing output pulses after each cycle and gate sequencer 51 continues stepping. Gate sequencer 51 energizes gates 54 and 53 in sequence to generate waveform steps 77 and 80 in FIG. 2. Waveform steps 72, 74, 76, 77, and 80 generally represent a staircase waveform approximation to curve 70 between sample points $S_0$ and $s_1$.

At the end of the fifth cycle of counter 47, counter 42 also provides an output pulse which resets counter 42 and causes data signal $S_1$ to shift from register 16 to register 20. The output pulse from counter 42 also causes digital buffer 14 to provide data signal $S_2$ at output 15 and causes register 16 to store data signal $S_2$. The output pulse from counter 42 in addition causes digital buffer 14 to provide a digital signal representative of $\Delta T_2$ at output 43. The fifth output pulse from counter 47 causes gate sequencer 51 to energize gate 57 again. Now counter 47 cycles five more times energizing gates 57, 56, 55, 54, and 53 in sequence to generate a staircase waveform between sample points $S_1$ and $S_2$. When the fifth output pulse occurs from counter 47, counter 42 again provides an output pulse which shifts registers 16 and 20 to the next pair of samples ($S_2$ and $S_3$).

Figure 4:
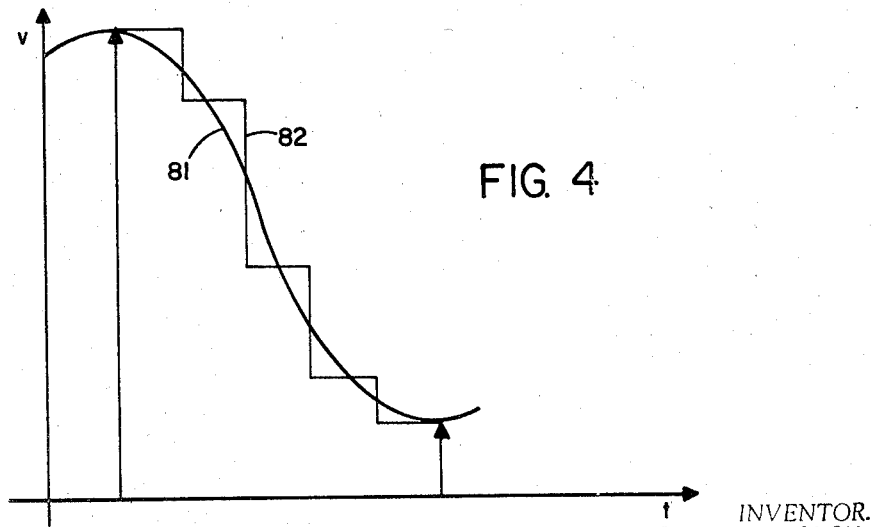
FIG. 4 is a graph showing waveforms to further aid in explaining FIG. 1.

In FIG. 2 each step of the staircase waveform is equal in time duration and in amplitude. In most cases it would be preferable to vary the amplitudes and/or times of the various steps to approximate some well-known type of waveform. For example, it may be desired to approximate a sine wave since such an approximation may be closest to the signal coded by coder 10. Generally, it is also preferable to vary the amplitudes rather than the time duration of the steps since it is much easier to vary the amplitudes. To vary the time durations would require a variation in the times at which counter 47 provides output pulses and it would require considerable digital circuitry to modify or vary the cycle times. Amplitude variations of the steps merely requires a variation in the size of resistors 32, 34, 36, and 37. An example of how a sine wave can be approximated is illustrated in FIG. 4. The smooth curve 81 is generally sinusoidal. The amplitude of the steps in the staircase waveform approximation 82 are selected to approximate the waveform 81 as closely as possible. After filtering by filter and buffer amplifier 60, the signal provided at output 61 can be quite close to a sine wave. The values of the resistors in the voltage divider can also be selected to diminish or eliminate unwanted harmonics in the output waveform. For example, a five-level approximation as shown in FIG. 4 can be made while eliminating the second through seventh harmonics. Most of the remaining harmonics can be eliminated by filtering if desired. If more levels or steps are used in the approximation, the harmonic content can be further reduced. The manner of selecting the sizes of the resistors in the voltage divider to reduce the unwanted harmonic content is to perform a Fourier analysis of the staircase waveform and to select the resistor values such that the amplitude coefficient of the unwanted harmonics will be zero.

While I have shown and described one embodiment of my invention, it will be evident to those skilled in the art that many variations and modifications can be made within the scope and spirit of my claimed invention.

I claim:
1. Decoder apparatus comprising, in combination:
   input means for providing successive data signals representative of samples of a signal;
   first and second register means for holding the data signals, said first register means being connected to said second register means for the transfer of data signals from said first register means to said second register means;
   means connecting said input means to said first register means;

first and second converter means, connected to said first and second register means, respectively, for converting the data signals contained in said first and second register means to analogue voltages;

voltage divider means, connected between said first and second converter means, for dividing the voltage difference between the analogue voltages provided by said first and second converter means into $n$ voltages where $n$ is a whole number;

means, connected to said input means and to said first and second register means, for controlling the transfer of data signals from said input means to said first and second register means;

means, connected to said means for controlling the transfer of data signals and to said voltage divider means, for successively providing output voltages representing each of the $n$ voltages provided by said voltage divider means; and output means, connected to said means for successively providing output voltages, for receiving the output voltage from said means for successively providing output voltages.

2. Decoder apparatus as defined in claim 1 wherein said voltage divider means includes a serial combination of resistors and said means for controlling the transfer of data signals includes a first counter to time the interval between successive data signals and a second counter to time the period during which said means for successively providing output voltages provides voltages representative of each of the $n$ voltages.

3. Decoder apparatus comprising, in combination:

input means for providing data signals representative of samples taken at maximum and minimum points of a signal;

means for providing signals representative of the time difference between successive data signals;

first register means for holding a first data signal;

second register means for holding a second data signal;

means connecting said first register means to said second register means for transferring the data signals in said first register means to said second register means;

means connecting said input means to said first register means for transferring data signals to said first register means;

first converting means connected to said first register means for converting the data signals in said first register means to analogue voltages;

second converting means connected to said second register means for converting the data signals in said second register means to analogue voltages;

voltage divider means connected between said first converter means and said second converter means for dividing the voltage difference between the analogue voltage provided by said first converter means and the analogue voltage provided by said second converter means into $n$ discrete voltages where $n$ is a whole number;

timing means connected to said means for providing signals representative of the time difference between successive data signals, said first register means, and said second register means for controlling the transfer of data signals from said input means to said first register means and from said first register means to said second register means and for providing timing signals to indicate changes between successive ones of the $n$ discrete voltages;

gating means connected to said voltage divider means and to said timing means for receiving the timing signals and the $n$ discrete voltages and for providing an output signal successively indicative of each of the $n$ discrete voltages; and output means connected to said gating means to receive the output signal therefrom.

4. Decoder apparatus as defined in claim 3 wherein said voltage divider means is a serial combination of resistance means for providing the $n$ discrete voltages.

5. Decoder apparatus as defined in claim 3 wherein said timing means includes a first counter for timing the interval between successive data signals and a second counter for timing the periods during which said gating means provides each successive one of said $n$ discrete voltages.

6. Decoder apparatus as defined in claim 4 wherein said timing means includes a first counting means connected to receive the signals representative of the time difference between successive data signals and to provide signals to said input means and to said first and second register means;

said timing means includes a second counting means connected to receive the signals representative of the time difference between successive data signals and to provide the timing signals to said gating means; and said gating means includes $n$ gates each connected to receive one of the $n$ discrete voltages provided by said voltage divider means and to provide an output signal indicative of the voltage received when an enabling signal from said second counting means is received.

7. Decoding apparatus as defined in claim 6 wherein the values of the resistors of said voltage divider means are such that the output signals from said gating means approximates a desired curve.